(12) United States Patent
Park et al.

(10) Patent No.: US 10,109,424 B2
(45) Date of Patent: Oct. 23, 2018

(54) MULTILAYER CERAMIC CAPACITOR USING POLING PROCESS FOR REDUCTION OF VIBRATION

(71) Applicant: INDUSTRY-ACADEMIC COOPERATION FOUNDATION YONSEI UNIVERSITY, Seoul (KR)

(72) Inventors: No Cheol Park, Seoul (KR); Byung Han Ko, Seoul (KR); Kyoung Su Park, Seoul (KR); Sang Geuk Jeong, Yeongcheon-si (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 127 days.

(21) Appl. No.: 14/692,172

(22) Filed: Apr. 21, 2015

(65) Prior Publication Data

US 2015/0302993 A1    Oct. 22, 2015

(30) Foreign Application Priority Data

Apr. 22, 2014  (KR) .......................... 10-2014-0047966

(51) Int. Cl.
*H01G 4/30*     (2006.01)
*H01G 4/012*    (2006.01)
*H01G 4/248*    (2006.01)
*H01G 4/12*     (2006.01)

(52) U.S. Cl.
CPC ............... *H01G 4/30* (2013.01); *H01G 4/012* (2013.01); *H01G 4/12* (2013.01); *H01G 4/248* (2013.01)

(58) Field of Classification Search
CPC ........................................................ H01G 4/30
See application file for complete search history.

(56) References Cited

U.S. PATENT DOCUMENTS

| 4,644,259 A * | 2/1987 | Boser ................... G01R 31/028 324/519 |
| 5,459,635 A * | 10/1995 | Tomozawa ............. H01G 4/306 361/311 |
| 2003/0061694 A1* | 4/2003 | Kamitani ................. H01G 4/12 29/25.42 |

(Continued)

FOREIGN PATENT DOCUMENTS

| JP | 2000133852 A  * | 5/2000 |
| JP | 2005228865 A  * | 8/2005 |

(Continued)

*Primary Examiner* — Eric Thomas
(74) *Attorney, Agent, or Firm* — LRK Patent Law Firm

(57) ABSTRACT

The present invention relates to a multi-layer capacitor. The multi-layer capacitor of the present invention includes a main body formed by alternately stacking a plurality of dielectric layers and a plurality of inner electrode layers, in which all the plurality of dielectric layers are poled in a same direction; a cover layer for covering and protecting the main body from outside; and outer electrodes electrically connected to the inner electrode layers to apply voltage to the inner electrode layers. Since deformation is offset overall in the multi-layer capacitor of the present invention, the piezoelectric effect occurs in an opposite direction in each of adjacent dielectric layers due to the poling process, and thus the present invention has an effect of reducing vibration and noise.

8 Claims, 10 Drawing Sheets

(56) References Cited

U.S. PATENT DOCUMENTS

| | | | |
|---|---|---|---|
| 2004/0245561 A1* | 12/2004 | Sakashita | B32B 18/00 |
| | | | 257/310 |
| 2011/0051315 A1* | 3/2011 | Dogan | B82Y 30/00 |
| | | | 361/321.5 |
| 2011/0075321 A1* | 3/2011 | Yamaguchi | C04B 35/46 |
| | | | 361/313 |
| 2013/0201603 A1* | 8/2013 | Chung | H01G 4/012 |
| | | | 361/303 |
| 2014/0063689 A1* | 3/2014 | Blair | H01G 4/06 |
| | | | 361/311 |

FOREIGN PATENT DOCUMENTS

| | | |
|---|---|---|
| KR | 10-2005-0017244 A | 2/2005 |
| KR | 10-2005-0108054 A | 11/2005 |
| KR | 10-2010-0066080 A | 6/2010 |
| KR | 10-2014-0038871 A | 3/2014 |
| KR | 10-2014-0038911 A | 3/2014 |
| KR | 10-2014-0038916 A | 3/2014 |
| KR | 10-2014-0040547 A | 4/2014 |

* cited by examiner

MULTILAYER CERAMIC CAPACITOR USING POLING PROCESS FOR REDUCTION OF VIBRATION

BACKGROUND OF THE INVENTION

Field of the Invention

The present invention relates to a multi-layer capacitor using a poling process for reduction of vibration, and more specifically, to a multi-layer capacitor which uses a dielectric substance poling-processed in advance to eliminate mechanical vibration generated by piezoelectric characteristics of the dielectric material of the multi-layer capacitor or noises generated by the vibration.

Background of the Related Art

A capacitor is a passive element performing a function of accumulating electric charges by applying voltage and according to thickness of a dielectric material and connection of electrodes, and a multi-layer capacitor is a chip type capacitor stacking multiple layers of dielectric materials and electrode areas in the form of small-sized thin films according to usage of electrostatic capacity and rated voltage. Particularly, a multi-layer ceramic capacitor, the dielectric material of which is configured of ceramic, is mainly used as the multi-layer capacitor.

Multi-layer ceramic capacitors are mainly used for TVs, VCRs, PCs, Automotive Electrical Components and communication devices since they have a low lead inductance and excellent high frequency properties. The multi-layer ceramic capacitors are ceaselessly developed in close connection with trends of set devices and, recently, they are developed further more rapidly owing to miniaturization of set devices focused on mobile communication devices. Electrostatic capacity of the multi-layer ceramic capacitors also increases owing to thin and multi-layered dielectric layers, expansion of effective areas, improvement of materials and the like.

Barium titanate of high permittivity and superior dielectric loss is used as a main matter (or compound) of the dielectric material of the multi-layer ceramic capacitors. However, the barium titanate has a disadvantage of a large piezoelectric coefficient. The piezoelectric coefficient generates vibration of an audible frequency band in a substrate, in which the multi-layer ceramic capacitor is installed, by converting electrical signals into mechanical signals. Such vibration lowers reliability of the installed parts or generates noises by generating vibration of a printed circuit board. When a voice communication is performed using a cellular phone, this vibration is output through a speaker as a noise.

Although a method of installing two multi-layer ceramic capacitors up and down has been proposed in the prior art to prevent vibration generated by the multi-layer ceramic capacitors or noises generated by the vibration, it works as a factor of design constraint of a printed circuit board, and if one of the two multi-layer ceramic capacitors is applied only to offset the vibration, there is a problem of lowering installation density of the printed circuit board.

In addition, also a method of eliminating vibration generated by the multi-layer ceramic capacitor or noises generated by the vibration by packaging a plurality of multi-layer ceramic capacitors using an insulative flexible substrate of 50 to 500 μm and absorbing the vibration generated by the multi-layer ceramic capacitors using the insulative flexible substrate or lead terminals has been proposed, there is a disadvantage in that it is practical only when the plurality of multi-layer ceramic capacitors is used as a package, and it can be used only exactly as the multi-layer ceramic capacitors are installed in advance.

SUMMARY OF THE INVENTION

Therefore, the present invention has been made in view of the above problems, and it is an object of the present invention to provide a multi-layer capacitor, in which vibration and noise are reduced by generating a piezoelectric effect in dielectric layers in opposite directions through the process of poling the dielectric substances.

To accomplish the above object, according to one aspect of the present invention, there is provided a multi-layer capacitor including a main body formed by alternately stacking a plurality of dielectric layers and a plurality of inner electrode layers, all the plurality of dielectric layers being poled in a same direction; a cover layer for covering and protecting the main body from outside; and outer electrodes electrically connected to the inner electrode layers to apply voltage to the inner electrode layers. Preferably, the poling direction of the plurality of poled dielectric layers is a direction perpendicular to a surface direction of the inner electrode layers.

The plurality of dielectric layers may be configured of piezoelectric ceramic.

The piezoelectric ceramic may include barium titanate.

A multi-layer capacitor module of the present invention is configured to include a circuit board in which a plurality of multi-layer capacitors is installed.

A method of manufacturing a multi-layer capacitor according to the present invention includes the steps of forming a plurality of inner electrodes on a dielectric substance; manufacturing a main body by stacking a plurality of dielectric layers and the plurality of inner electrode layers; poling all of a plurality of dielectric layers in a same direction; surrounding the main body with a cover layer; and forming outer electrodes electrically connected to the inner electrode layers.

The poling direction of the plurality of poled dielectric layers is a direction perpendicular to a surface direction of the inner electrode layers.

The poling step may include the steps of forming the outer electrode layers on a top and bottom of the ceramic main body; applying voltage; and removing the outer electrode layers after applying the voltage.

The poling step may include the step of interposing the main body between electrode plates where an electric field is formed in a predetermined direction.

The method of manufacturing a multi-layer capacitor further includes, before the poling step, a de-poling step of heating the main body.

The method of manufacturing a multi-layer capacitor further includes, after the poling step, an aging step of stabilizing the main body.

DETAILED DESCRIPTION OF THE PREFERRED EMBODIMENT

Figure 1:
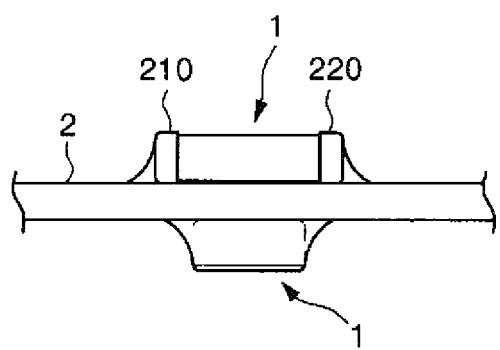
FIG. 1 is a view showing a conventional method of installing a multi-layer capacitor for reduction of vibration.

Although the preferred embodiments of the present invention will be hereafter described in detail with reference to the accompanying drawings, the scope of the present invention is not limited thereto. Detailed description will be omitted for publicized configurations, and in addition, if a configuration may make the spirit of the present invention unclear, detailed description thereof will be omitted.

A multi-layer capacitor according to an embodiment of the present invention may include a main body 100 formed by alternately stacking a plurality of dielectric layers 11 and 12 and a plurality of inner electrode layers 21 and 22, in which all the plurality of dielectric layers 11 are poled in the same direction; a cover layer 40 surrounding the main body 100; and outer electrodes 210 and 220 electrically connected to the inner electrode layers 21 and 22 to apply voltage to the inner electrode layers 21 and 22.

'Polarization' stated through the specification generally means a phenomenon of generating electrical dipole moments as the charge distribution of a material is changed in an electric field.

Figure 4:
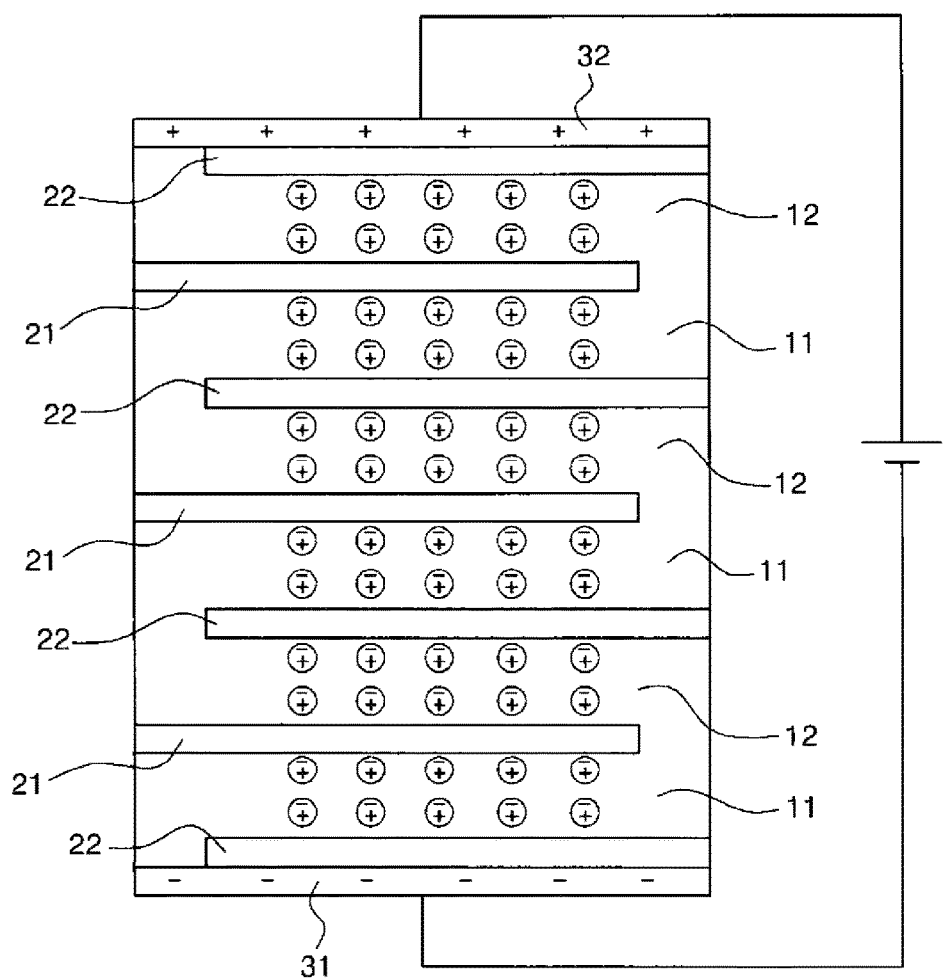
FIG. 4 is a cross sectional view of the main body showing a state of poling dielectric layers after outer electrode layers are formed on the main body.

Referring to FIG. 4, the poling direction of a plurality of dielectric layers 11 and 12 according to an embodiment of the present invention may be generally a direction vertical (perpendicular) to the surface direction of the inner electrode layers 21 and 22.

A dielectric substance according to an embodiment of the present invention may be a material generating electric polarization when an electric field is applied. The dielectric layer 10 is a thin layer manufactured using the dielectric substance.

The dielectric substance according to an embodiment of the present invention may be a piezoelectric material, and, particularly, it may be configured of piezoelectric ceramic. Here, barium titanate is preferably used as the piezoelectric ceramic. Since the barium titanate has ferroelectric, piezoelectric and dielectric characteristics, it is widely used as a material of a multi-layer ceramic capacitor (MLCC).

After mixing dielectric ceramic powders of barium titanate with a binder, additives, a solvent and the like, a dielectric slurry in which the ceramic powders are evenly distributed in the solvent is manufactured through wet milling or the like, and the dielectric layer 10 can be manufactured using the dielectric slurry through a method such as the doctor blade or the like.

The inner electrode layer 20 according to an embodiment of the present invention is preferably manufactured in a thickness of a few μm unit. Since the multi-layer capacitor tends to be lighter and smaller day by day and needs to be thinner in order to enhance electrostatic capacity of the capacitor, it is preferably manufactured in a few μm unit.

Although the inner electrode may be manufactured using various materials, it can be preferably manufactured using Ag, Pd, Pt, an Ag—Pd alloy or the like.

Figure 3:
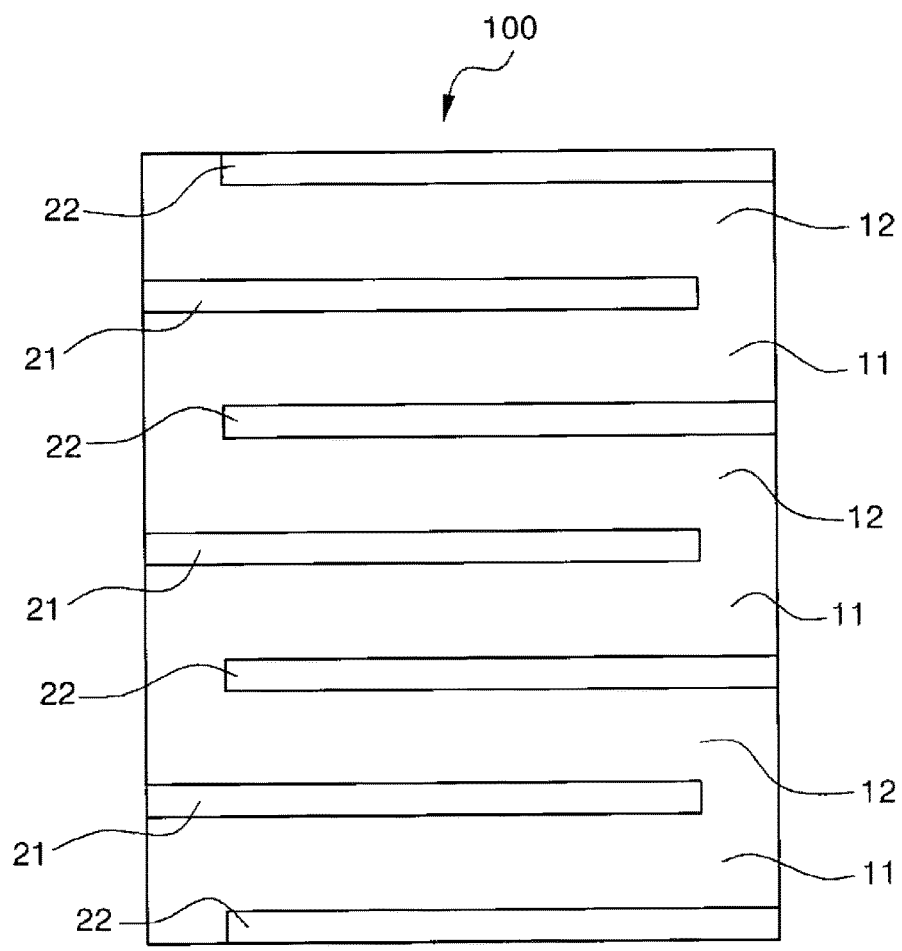
FIG. 3 is a cross sectional view showing a main boy stacking dielectric layers formed with inner electrode layers.

As shown in FIG. 3, inner electrode patterns, i.e., first and second inner electrode layers 21 and 22, are formed by printing a conductive paste on the dielectric layer 10. The main body 100 is configured by stacking a plurality of dielectric layers 10 in which the first and second inner electrode layers are formed. Here, a dielectric layer 10 under the first inner electrode layer 21 is referred to as a first dielectric layer 11, and a dielectric layer 10 under the second inner electrode layer 22 is referred to as a second dielectric layer 12.

Figure 2:
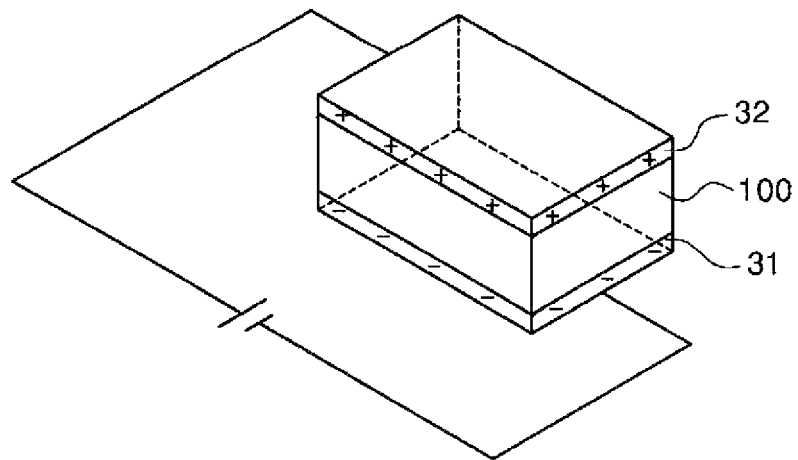
FIG. 2 is a perspective view showing a multi-layer capacitor and a poling device.

As shown in FIGS. 2 and 4, for a poling process, an outer electrode layer 30 may be formed on the top and bottom sides of the main body 100 by applying a conductive paste using Ag or an Ag—Pd alloy. In addition, polarization may be performed on the dielectric layer 10 by applying voltage of some kV through the outer electrode layer 30.

Figure 12:
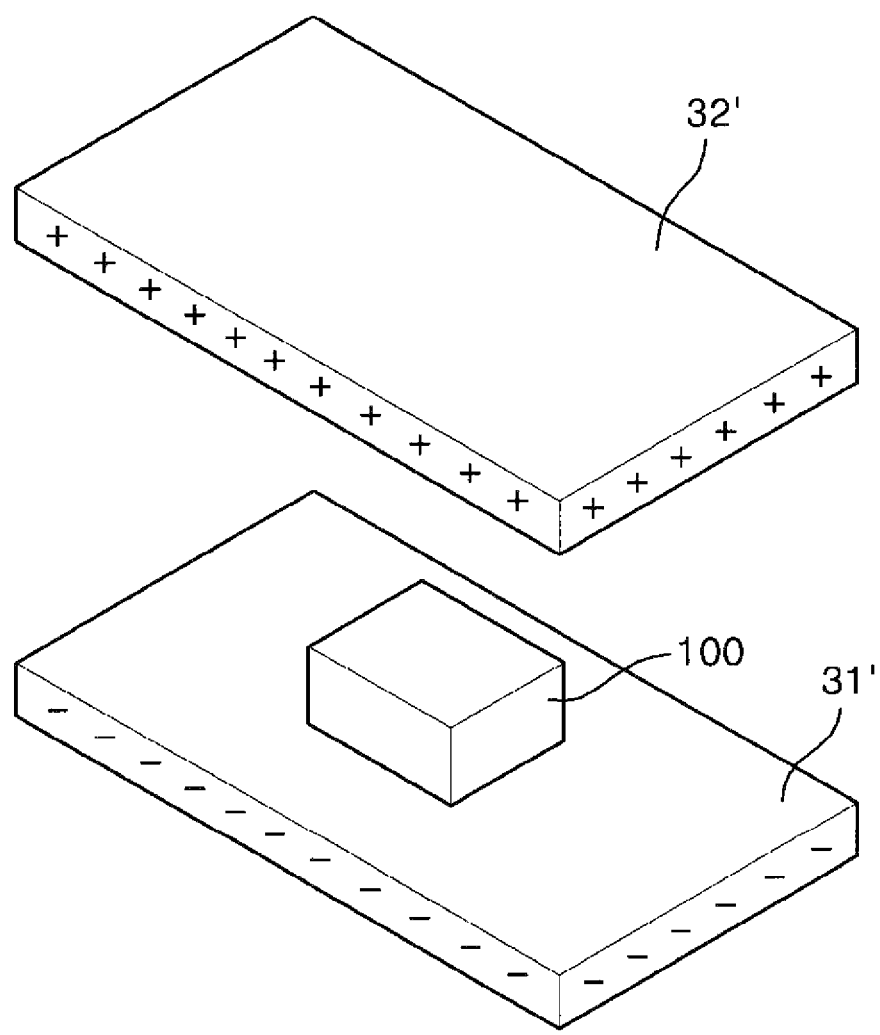
FIG. 12 is a perspective view showing a multi-layer capacitor and a poling device of another embodiment.

As shown in FIG. 12, A poling process according to another embodiment of the present invention may be performed by interposing the main body 100 between wide counter electrode plates 31' and 32' where an electric field is formed in a predetermined direction, unlike separately forming the outer electrode layer on the top and bottom of the main body 100 and applying voltage. This is advantageous to mass production of the multi-layer capacitor.

The poling process according to an embodiment of the present invention is performed by applying a DC electric field for a predetermined period of time. The poling process is preferably performed in silicon oil in order to avoid discharge.

Preferably, the poling process may be performed by applying an electric field at a temperature higher than a phase transition temperature.

In the case of barium titanate, which is an embodiment of the present invention, it is preferable to apply the electric field at a temperature between 120° C. and 1000° C. The polarization of the barium titanate may occur only when the temperature is 120° C. or higher since the phase transition temperature is 120° C. If the temperature is 1000° C. or higher, it is higher than the melting point of the inner electrode layer 20, and deformation may occur in the shape of the ceramic main body 100, and thus the temperature is preferably set to be lower than 1000° C.

In addition, the poling process should be performed by applying an electric field, and it is preferably performed in an electric field of 1 kV/mm to 5 kV/ram. Efficiency of poling is relatively low in an electric field lower than 1 kV/mm, and an insulation breakdown may occur in an electric field exceeding 5 kV/mm.

Figure 5:
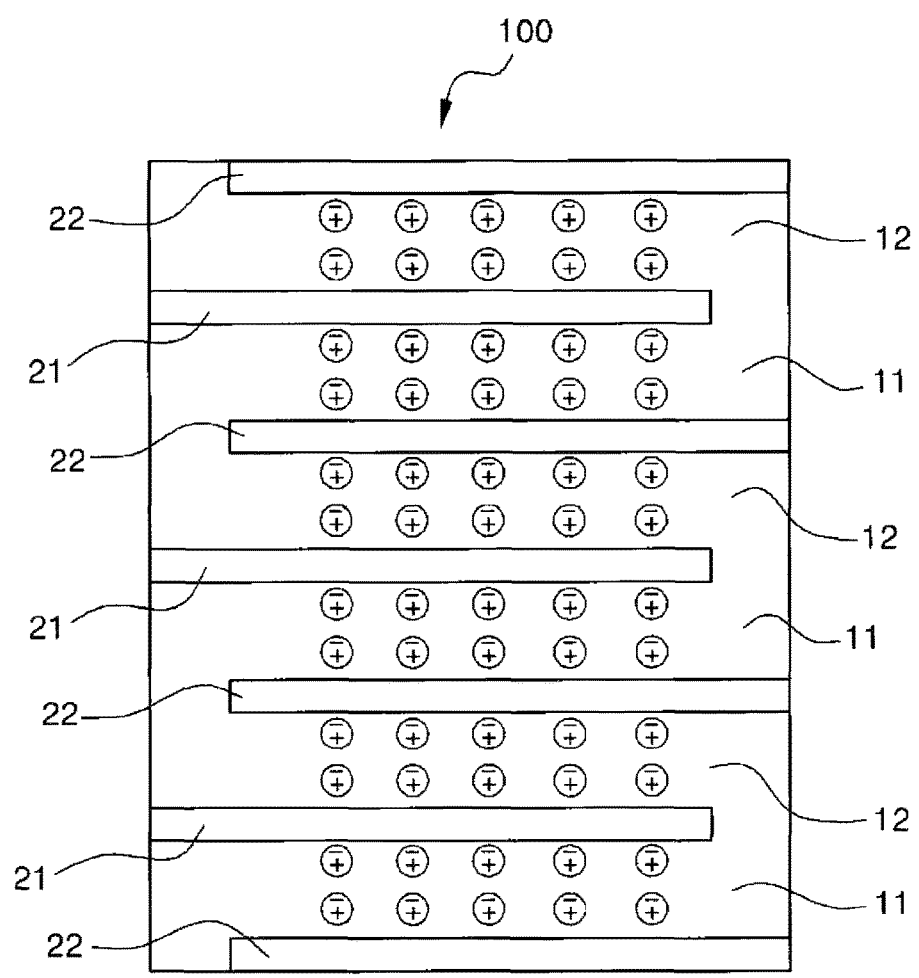
FIG. 5 is a cross sectional view of the main body showing a state of removing the outer electrode layers after the dielectric layers are poled.

As shown in FIG. 5, the dielectric substance which is generally not polarized is polarized in one direction due to the poling process. That is, after performing the poling process, all the dielectric layers 10 will have the same directionality while one side of each dielectric layer is negatively charged and the other side of which is positively charged.

Figure 6:
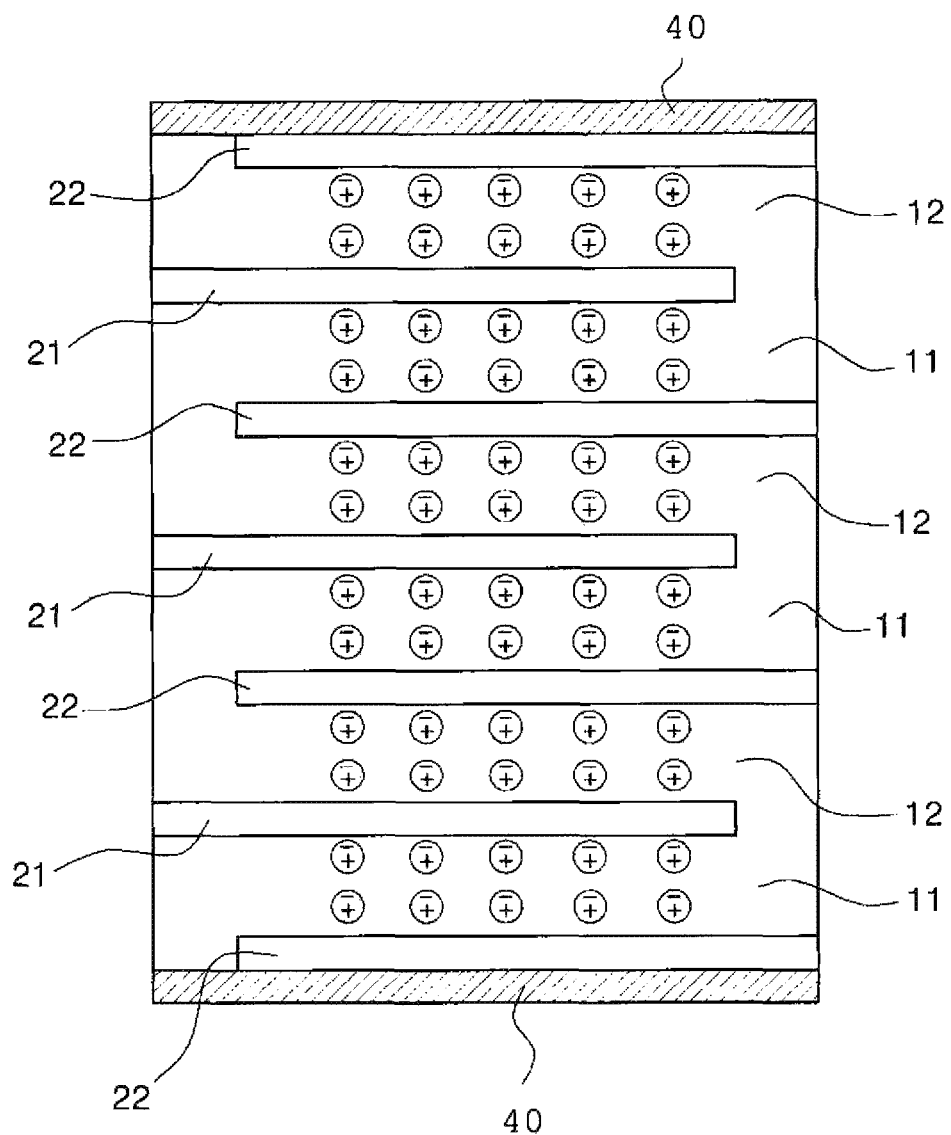
FIG. 6 is a cross sectional view of the main body surrounded by a cover layer after the outer electrode layers are removed.

After performing the poling process, as shown in FIG. 6, a cover layer 400 may additionally surround the main body 100. Surrounding the main body 100 with the cover layer 40 is stacking or applying an insulator around the main body 100. In addition, it may be stacking or applying an insulator on the top and bottom of the main body 100. The cover unit 40 may perform a function of protecting or shielding the main body 100 from physical, chemical and other shocks of the outside.

Figure 7:
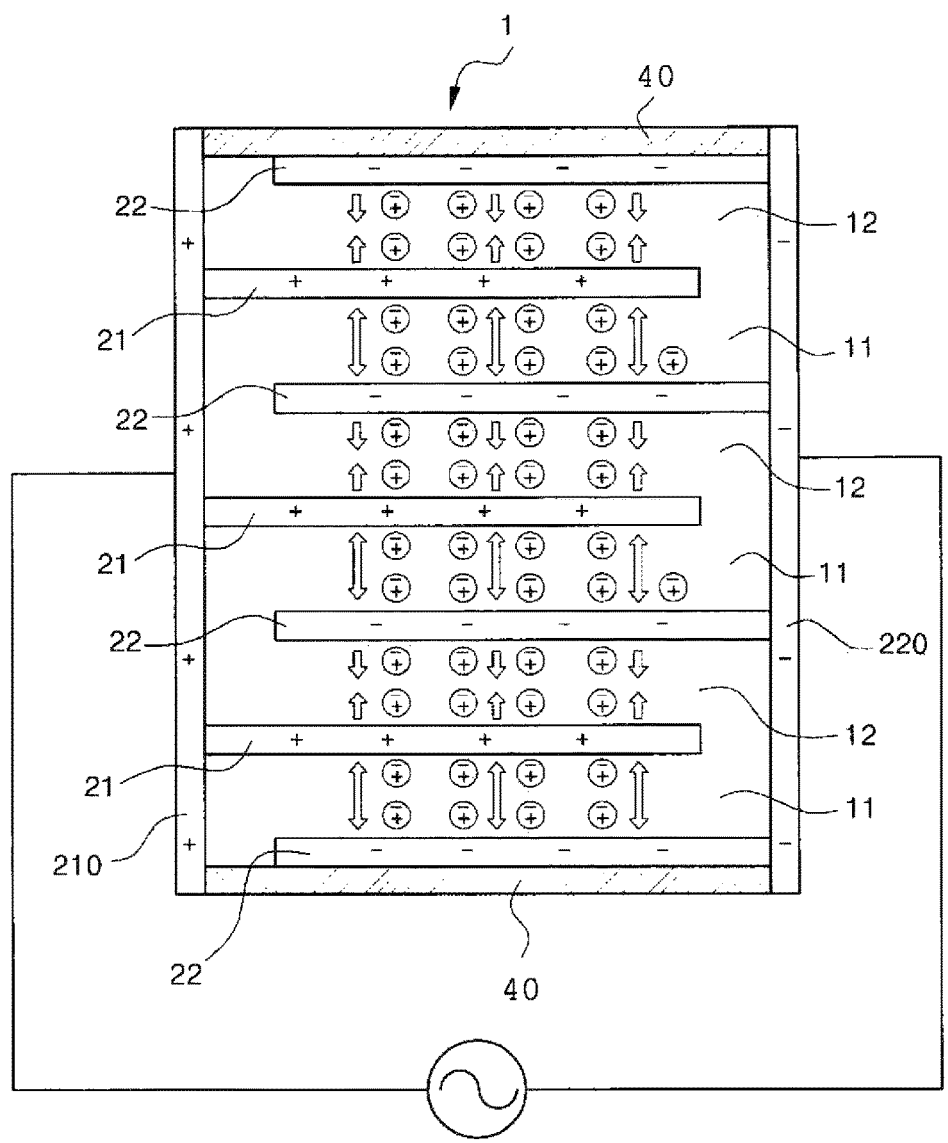
FIGS. 7 and 8 are cross sectional views showing expanded and contracted states of first and second dielectric layers when AC voltage is applied after outer electrodes are formed.
Figure 8:
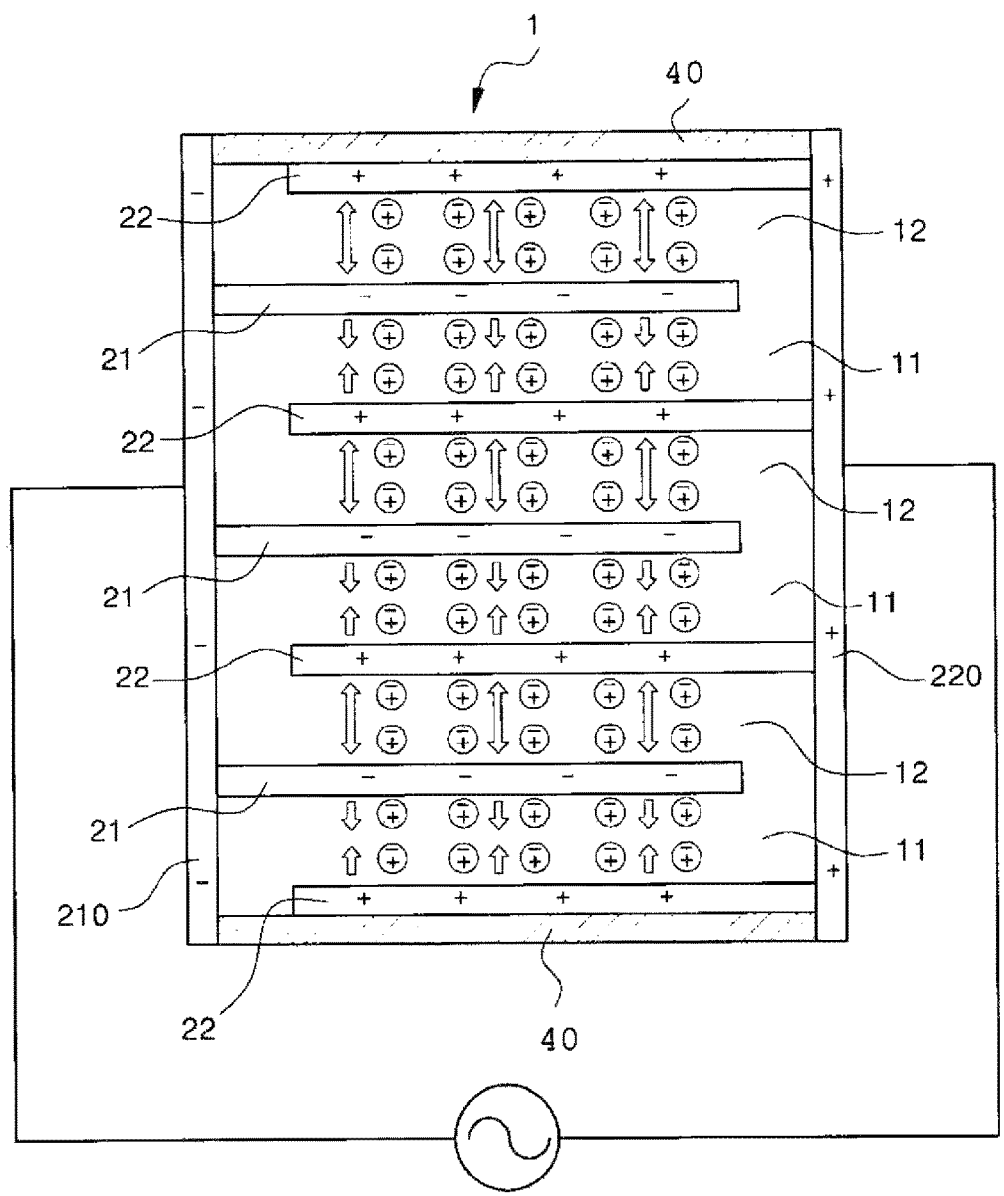

Referring to FIGS. 7 and 8, the outer electrodes 210 and 220 according to an embodiment of the present invention may be positioned on both side surfaces of the main body 100. The outer electrodes 210 and 220 may be disposed in vertically contact with the main body 100 on which the cover layer 40 is stacked and surround the side surface of the main body to perform a function of protecting or shielding the main body 100 together with the cover layer 40.

At this point, it may be a form in which the inner electrode layers 20 alternately contact with the first outer electrode 210 and the second outer electrode 220 so that the end portions of all the dielectric layers 10 are connected to each other. That is, the first inner electrode layer 21 may be connected to the first outer electrode 210, and the second inner electrode layer 22 may be connected to the second outer electrode 220. The 'connection' means electrical connection. That is, the first and second outer electrodes 210 and 220 perform a function of supplying voltage, which is supplied from outside, to the inner electrode layers 20.

As an embodiment, the outer electrodes 210 and 220 on both sides are alternately charged with positive and negative electricity due to the AC current supplied from outside. The inner electrode layers 20 are charged to be the same as the adjacent and electrically connected outer electrodes 210 and 220. Accordingly, as shown in FIGS. 7 and 8, the inner electrode layers 20 are alternately charged with positive and negative electricity. Accordingly, since adjacent inner electrode layers are charged with opposite electricity, electric fields of opposite directions are applied to the adjacent dielectric layers 10, respectively.

In summary, since the poling directions of all dielectric layers 10 poled in advance are consistent, if the poling direction of a dielectric layer 10 corresponds to the direction of an applied electric field, the poling direction of an adjacent dielectric layer 10 will be opposite to the direction of the applied electric field.

Describing an embodiment with reference to FIG. 7, the dielectric material (e.g., piezoelectric ceramic) of each dielectric layer 11 or 12 is poled in advance to be negatively charged in the upper portion and positively charged in the lower portion. The inner electrode layer 22 is electrically connected to the outer electrode 220, and the other adjacent inner electrode layer 21 is electrically connected to the outer electrode 210 of the other side. If voltage is applied to positively charge the outer electrode 210 and negatively charge the outer electrode 220 of the other side, the inner electrode layer 22 above the dielectric layer 12 is negatively charged and the inner electrode layer 21 below the dielectric layer 12 is positively charged. In this case, since a repulsive force acts at the portions where the dielectric layer 12 contacts with the inner electrode layers 21 and 22, there is an effect of contracting the dielectric layer 12.

On the other hand, when the inner electrode layer 21 above an adjacent dielectric layer 11 is positively charged and the inner electrode layer 22 below the adjacent dielectric layer 11 is negatively charged, since an attractive force acts at the portions where the dielectric layer 11 contacts with the inner electrode layers 21 and 22, there is an effect of expanding the dielectric layer 11.

Describing overall the main body 100 of the multi-layer capacitor according to an embodiment of the present invention, since expanding dielectric layers 11 and contracting dielectric layers 12 alternately exist, the piezoelectric effect occurs in an opposite direction in each layer, and thus there is an effect of offsetting vibration or deformation overall.

Accordingly, since the piezoelectric effects are offset overall within one capacitor, there is an effect of reducing vibration and noise even when only one capacitor is used, unlike the conventional technique.

In the case of FIG. 8, opposite charges are respectively applied to the outer electrodes 210 and 220 according to an embodiment of the present invention in contrast to FIG. 7, and, as a result, an effect the same as described above, i.e., an effect of offsetting the piezoelectric effects overall within one capacitor, occurs.

Hereinafter, a multi-layer capacitor module according to an embodiment of the present invention will be described.

Figure 9:
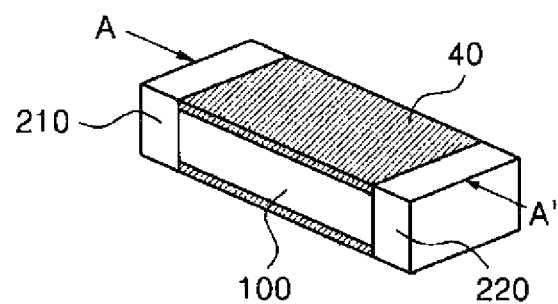
FIG. 9 is a perspective view showing a multi-layer capacitor of the present invention.
Figure 10:
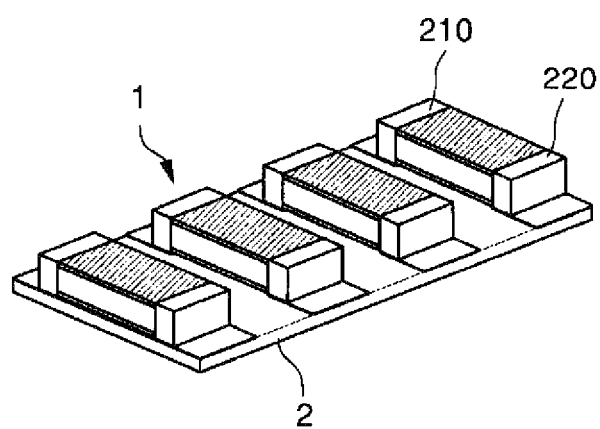
FIG. 10 is a perspective view showing a multi-layer capacitor module of the present invention.

FIG. 9 is a perspective view showing a multi-layer capacitor of the present invention, and FIG. 10 is a perspective view showing a multi-layer capacitor module of the present invention.

A multi-layer capacitor module according to an embodiment of the present invention may include a multi-layer capacitor 1 and a circuit board 2 in which a plurality of multi-layer capacitors is installed in an array. A printed circuit board or a flexible circuit board may be used as the circuit board 2. The array of the capacitors may be diverse according to the size of shape of the circuit board.

Since a plurality of capacitors is packaged in a capacitor module, this is advantageous in that productivity of an installation work and installation density can be improved.

Next, a method of manufacturing a multi-layer capacitor according to an embodiment of the present invention will be described in detail.

A method of manufacturing a multi-layer capacitor may include the steps of forming a plurality of inner electrode layers 21 and 22 on a dielectric substance; manufacturing a main body 100 by stacking a plurality of dielectric layers 11 and 12 and the plurality of inner electrode layers 21 and 22; poling all of a plurality of dielectric layers 11 and 12 in a same direction; surrounding the main body 100 with a cover layer 40; and forming an outer electrode 200 electrically connected to the inner electrode layers 21 and 22. Here, the poling direction of the plurality of dielectric layers 11 and 12 is perpendicular to the surface direction of the inner electrode layers 21 and 22.

Referring to FIGS. 4 and 5 again, the poling step of the method of manufacturing a multi-layer capacitor according to an embodiment may include the steps of forming outer electrode layers on the top and bottom of the ceramic main body; applying voltage; and removing the outer electrode layers after applying voltage.

Alternatively, a method of manufacturing a multi-layer capacitor according to another embodiment may be poling, without separately forming the outer electrode layers 11 and 12, by interposing the main body 100 between wide and flat counter electrode plates (FIG. 12) to which an electric field is applied in a predetermined direction.

Figure 11:
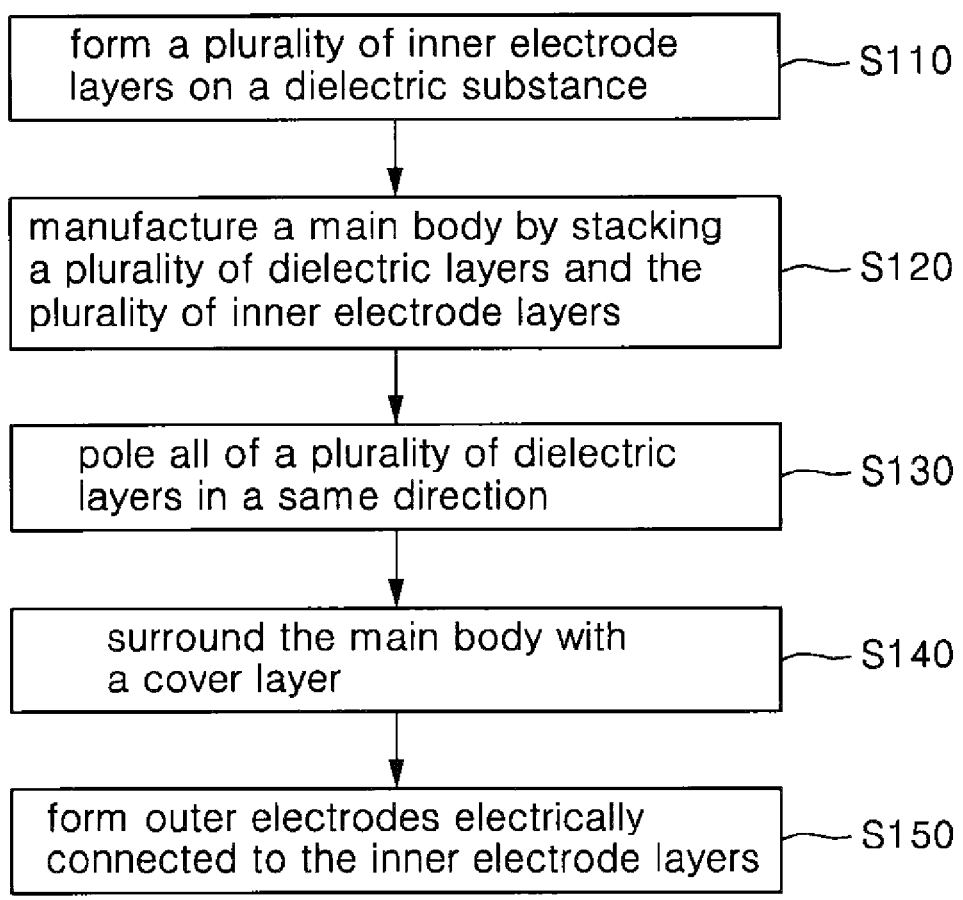
FIG. 11 is a flowchart illustrating a method of manufacturing a multi-layer capacitor for reduction of vibration.

An embodiment of the present invention is described below in further detail with reference to FIG. 11.

In the embodiment hereinafter, a case of configuring the dielectric layers using piezoelectric ceramic, particularly, a case of using barium titanate, is described as an example. However, it may not be necessarily limited to such a material.

Piezoelectric ceramic is obtained by mixing barium titanate with distilled water and calcining the mixture for a predetermined time. The piezoelectric ceramic is mixed with a binder or a plasticizer, and a piezoelectric ceramic green sheet, i.e., a dielectric substance, is obtained in the doctor blade method.

Step S110: form a plurality of inner electrode layers on a dielectric substance.

A conductive paste for inner electrodes using Ag powders or Ag—Pd alloy powders is manufactured. Inner electrode patterns, i.e., first and second inner electrode layers 21 and 22, are formed by printing the conductive paste on the first and second dielectric layers 11 and 12.

Step S120: manufacturing a main body by stacking a plurality of dielectric layers and the plurality of inner electrode layers.

A ceramic main body 100 can be manufactured by stacking the first and second dielectric layers 11 and 12 in which the first and second inner electrode layers 21 and 22 are formed. That is, the ceramic main body 100 is manufactured by stacking the first dielectric layer 11 in which the first inner electrode layer 21 is formed and the second dielectric layer 12 in which the second inner electrode layer 22 is formed.

Step S130: pole all of a plurality of dielectric layers in a same direction.

An outer electrode layer 30 can be formed by applying the conductive paste using Ag or an Ag—Pd alloy on the top and bottom of the ceramic main body 100. Then, after poling the dielectric layer 10 by applying voltage of some kV through the outer electrode layer 30, the outer electrode layer 30 may be removed. Here, the voltage for poling the dielectric layer 10 may vary depending on the thickness of the dielectric layer 10.

Spontaneous polarization of the dielectric substance may be evenly formed by applying the electric field at a temperature higher than a phase transition temperature (Curie temperature) in the polarization herein.

Step S140: surround the main body with a cover layer.

After removing the outer electrode layer 30, a cover layer 40 may surround the portion removing the outer electrode layer 30. Here, the cover layer 40 may be formed by stacking or applying an insulator.

Step S150: form outer electrodes layers electrically connected to the inner electrode layers.

Here, outer electrodes electrically connected to the inner electrode layer 20 can be formed. The outer electrodes 200 may be formed by applying a conductive paste using Ag or an An-Pd alloy to be positioned outside, particularly, on both side surfaces, of the main body 100 and perpendicular to the inner electrode layer 20 and may supply AC power to the inner electrode layer 20 from an external power supply.

Meanwhile, the method of manufacturing a multi-layer capacitor according to an embodiment may further include, before the poling step, the de-poling step of heating the main body. By performing the de-poling step, the spontaneous polarization which can be randomly formed in the dielectric substance is removed to make polarization of the present invention easy.

In addition, the method of manufacturing a multi-layer capacitor according to an embodiment may further include, after the poling step, the aging step of stabilizing the main body 100. After the poling step, it is preferable to remove the electric field and then stabilize the electrical characteristics of the elements by aging the poled main body 100 for twenty four hours or more approximately at a room temperature or six hours or more below a phase transition temperature. According to this, the multi-layer capacitor is manufactured.

The multi-layer capacitor using a poling process for reduction of vibration of the present invention as described above has an effect of offsetting deformation overall since a piezoelectric effect occurs in an opposite direction in each of adjacent dielectric layers when the capacitor operates by applying voltage to the outer electrode poled on the dielectric substance in advance in a predetermined direction.

Accordingly, vibration of a multi-layer capacitor structure can be reduced according to the piezoelectric effect. In addition, since vibration of a substrate in which the multi-layer capacitor is installed is reduced as the vibration of the multi-layer capacitor structure is reduced, degradation of reliability of the installed parts and generation of noise can be prevented.

In addition, since the vibration and noise generated by the capacitor can be reduced without stacking two multi-layer capacitors up and down, the problem of lowering the installation density and the problem of limiting the design of a printed circuit board can be solved.

Furthermore, since a method of packaging a plurality of multi-layer capacitors using an insulative flexible substrate may not be used, it is advantageous in that vibration and noise can be reduced even when the multi-layer capacitor is individually used, as well as when a plurality of multi-layer capacitors is used not in a packaged form.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A multi-layer capacitor comprising:
a main body formed by alternately stacking a plurality of dielectric layers and a plurality of inner electrode layers, the plurality of dielectric layers being poled in a same direction;
a cover layer for covering upper and lower surfaces of the main body and protecting the main body from outside; and
first and second outer electrodes which cover lateral surfaces of the main body and are electrically connected in an alternating manner to the inner electrode layers to apply voltage to the inner electrode layers while the plurality of dielectric layers are poled,
wherein each of the dielectric layers comprises multiple dipoles,
wherein most of the multiple dipoles are kept aligned perpendicular to upper and lower surfaces of the inner electrode layers regardless of whether or not voltage is applied to the first and second outer electrodes and regardless of polarity of the applied voltage, so that when the voltage is applied to the first and second outer electrodes, the dielectric layers adjacent to each of the inner electrode layers are deformed in opposite directions to each other, thereby offsetting deformation of the dielectric layers adjacent to each of the inner electrode layers.

2. The multi-layer capacitor according to claim 1, wherein the poling direction of the plurality of poled dielectric layers is a direction perpendicular to a surface direction of the inner electrode layers.

3. A multi-layer capacitor module configured to include a circuit board in which a plurality of multi-layer capacitors according to claim 2 is installed.

4. The multi-layer capacitor according to claim 1, wherein the plurality of dielectric layers is configured of piezoelectric ceramic.

5. The multi-layer capacitor according to claim 4, wherein the piezoelectric ceramic includes barium titanate.

6. A multi-layer capacitor module configured to include a circuit board in which a plurality of multi-layer capacitors according to claim 5 is installed.

7. A multi-layer capacitor module configured to include a circuit board in which a plurality of multi-layer capacitors according to claim 4 is installed.

8. A multi-layer capacitor module configured to include a circuit board, in which, a plurality of multi-layer capacitors according to claim 1 is installed.

* * * * *